(12) United States Patent
Viswanathan

(10) Patent No.: US 11,853,812 B2
(45) Date of Patent: Dec. 26, 2023

(54) SINGLE COMPONENT DATA PROCESSING SYSTEM AND METHOD UTILIZING A TRAINED NEURAL NETWORK

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

(*) Notice: Subject to any disclaimer, the term of this patent is extended or adjusted under 35 U.S.C. 154(b) by 1177 days.

(21) Appl. No.: 16/228,024

(22) Filed: Dec. 20, 2018

(65) Prior Publication Data

US 2020/0202476 A1 Jun. 25, 2020

(51) Int. Cl.
| | |
|---|---|
| *G06F 9/54* | (2006.01) |
| *G06N 3/08* | (2023.01) |
| *G06T 1/20* | (2006.01) |
| *G06T 3/00* | (2006.01) |
| *G06F 18/214* | (2023.01) |

(52) U.S. Cl.
CPC ............... *G06F 9/54* (2013.01); *G06F 18/214* (2023.01); *G06N 3/08* (2013.01); *G06T 1/20* (2013.01); *G06T 3/0056* (2013.01)

(58) Field of Classification Search
CPC ..................................... G06T 1/20; G06N 3/08
See application file for complete search history.

(56) References Cited

U.S. PATENT DOCUMENTS

| | | | | |
|---|---|---|---|---|
| 7,884,754 B1 * | 2/2011 | Alouani | ................ | G01S 13/726 |
| | | | | 342/189 |
| 8,675,105 B2 | 3/2014 | Lansel et al. | | |
| 8,965,104 B1 * | 2/2015 | Hickman | ................ | G06V 10/96 |
| | | | | 382/254 |

(Continued)

FOREIGN PATENT DOCUMENTS

| | | | |
|---|---|---|---|
| CN | 107561969 A * | 1/2018 | ........... A61B 5/0077 |
| CN | 108038853 A | 5/2018 | |
| WO | WO 2018/045274 A1 | 3/2018 | |

OTHER PUBLICATIONS

Translation of CN 107561969 A (Year: 2018).*

(Continued)

*Primary Examiner* — Grace Q Li
(74) *Attorney, Agent, or Firm* — Peter H. Yu; HERE GLOBAL B.V.

(57) ABSTRACT

Methods, systems, apparatuses, and computer program products are provided that are configured to processor sensor data using a single component specialized sensor data processing neural network. The single component data processing system is configured to receive input data from a sensor, analyze the input data using a neural network embodied by a single trained sensor data processing component, wherein the single trained sensor data processing component is trained to product output data that approximates a plurality of task-specific transformations performed in a pipeline manner, and produce the output data following transformation of the input data. Additionally, methods, systems, (Continued)

apparatuses, and computer program products are provided for training a single trained sensor data processing component to approximate a plurality of task-specific transformations performed in a pipeline manner.

18 Claims, 5 Drawing Sheets

(56) References Cited

U.S. PATENT DOCUMENTS

| | | | | |
|---|---|---|---|---|
| 9,344,690 | B2 | 5/2016 | Nowozin et al. | |
| 2013/0046803 | A1* | 2/2013 | Parmar | H04N 1/644 |
| | | | | 708/401 |
| 2015/0318015 | A1* | 11/2015 | Bose | H04N 7/188 |
| | | | | 386/248 |
| 2018/0022347 | A1* | 1/2018 | Myers | G01S 13/867 |
| | | | | 701/26 |
| 2018/0144241 | A1 | 5/2018 | Liu et al. | |
| 2018/0158177 | A1* | 6/2018 | Lannes | G06T 5/003 |
| 2019/0005603 | A1* | 1/2019 | Chen | G06N 3/08 |
| 2019/0005686 | A1* | 1/2019 | Liu | G16H 40/63 |
| 2019/0108618 | A1* | 4/2019 | Hwang | G06T 3/4015 |
| 2019/0147331 | A1* | 5/2019 | Arditi | G06N 20/00 |
| | | | | 706/20 |
| 2019/0161919 | A1* | 5/2019 | Gilbert | G01N 29/265 |
| 2020/0272864 | A1* | 8/2020 | Faust | G06N 3/08 |
| 2020/0342857 | A1* | 10/2020 | Moreno | G10L 15/30 |
| 2020/0389469 | A1* | 12/2020 | Litichever | H04L 63/0236 |

OTHER PUBLICATIONS

Extended European Search Report for Application No. EP 19217706.1 dated May 8, 2020, 8 pages.

Ishida, R. et al., *Approximate Adder Generation for Image Processing Using Convolutional Neural Network*, International Soc Design Conference (ISOCC), IEEE (Nov. 12, 2018) 38-39.

Berlincioni, L. et al., *Road Layout Understanding by Generative Adversarial Inpainting*, arXiv:1805.11746v2 [cs.CV] (Nov. 20, 2018), 18 pages.

Bescos, B. et al., *Removing Dynamic Objects From 3d Maps Using Geometry and Learning*, Learning for Localization and Mapping Workshop at IROS (Intelligent Robots and Systems) (2017) 5 pages.

Chen, C. et al., *Learning to See in the Dark*, Computer Vision Foundation (2018) 3291-3300.

Huang, S.J. et al., *Cost Effective Training of Deep CNNs With Active Model Adaptation*, arXiv:1802.05394v2 [cs.LG] (Jun. 5, 2018).

Schwartz, E. et al., *DeepISP: Towards Learning an End-to-End Image Processing Pipeline*, arXiv:1801.06724v1 [eess.IV] (Jan. 20, 2018) 8 pages.

Su. S. et al., *Deep End-to-End Time-of- Flight Imaging*, Computer Vision Foundation (2018) 6383-6392.

Yang, L. et al., *Suggestive Annotation: A Deep Active Learning Framework for Biomedical Image Segmentation*, arXiv:1706.04737v1 [cs.CV] (Jun. 15, 2017), 8 pages.

Office Action for European Application No. 19217706.1 dated Mar. 4, 2022, 5 pages.

\* cited by examiner

SINGLE COMPONENT DATA PROCESSING SYSTEM AND METHOD UTILIZING A TRAINED NEURAL NETWORK

TECHNOLOGICAL FIELD

Certain embodiments of the present disclosure relate generally to a method, apparatus, and computer program product for transforming input sensor data into output data utilizing a trained sensor data processing neural network trained to approximate a plurality of task-specific transformations.

BACKGROUND

Usage of sensor data increasingly informs technology driven decision making. In one such example, autonomous vehicles are equipped with a multitude of sensors designed to ensure the vehicles function as intended. These sensors include, but are not limited to, Light Detection and Ranging (LiDAR) Systems, Inertial Navigation Systems (INS), cameras, and radars. However, these sensors often capture signals, images, or other data in a raw input data form that is unusable to many other systems including, for example a perception system of an autonomous vehicle. To be useful, the input data must be processed, through various transformations, to reach a processed and interpretable form.

Depending on the type of sensor system used to collect the input data, the required transformation and processing steps differ. Converting input data to an interpretable form often requires a plurality of different transformations. In some instances, to facilitate these data transformations, a system on chip utilizes a plurality of specialized components. In some instances, the multiple components are organized in a linear pipeline such that data output from one specialized component flows to the input of the next specialized component until the entire transformation process is complete. Once the final specialized component performs its transformation, the data is output in an interpretable form.

However, in pipeline systems where each performs a single, specialized transformation, the number of components grows with the number of the transformations required to complete the data processing pipeline. As the number of components grows, the system requires a larger material footprint, increases required power consumption, and leads to increased costs. Similarly, the increased number of components decreases overall system efficiency and system efficacy.

For example, the color image rendering pipeline often includes the steps of [1] image sensor correction, [2] noise reduction, [3] image scaling, [4] gamma correction, [5] image enhancement, [6] color-space conversion, [7] chroma subsampling, [8] framerate conversion, and [9] image compression. Assuming these are the only steps that must be performed for a given system, a pipeline data processing system would require nine separate and specialized components—one for each individualized step. As additional steps are added to the pipeline, the number of additional specialized components required continues to grow as well, further exacerbating the increased footprint, power consumption, and associated material costs.

BRIEF SUMMARY

A method, apparatus and computer program product are therefore provided according to an example embodiment of the present invention for sensor data processing utilizing a trained sensor data processing neural network that is trained to approximate a plurality of task-specific transformation functions executed in a pipeline manner. By training a neural network to approximate a plurality of specific transformation functions executed in a pipeline manner, the trained sensor data processing neural network may replace the plurality of task-specific transformations performed in a pipeline manner. A single trained sensor data processing component embodying a trained sensor data processing neural network may replace a plurality of specialized components configured to perform a plurality of task-specific transformations in a pipeline manner. As such, the trained sensor data processing component may reduce the component silicon footprint, decrease required power consumption, decrease component costs, and improve efficiency and efficacy of sensor data processing systems.

An example embodiment includes an apparatus comprising a single trained sensor data processing component configured to process sensor data. The example apparatus is configured to, using the single trained sensor data processing component, receive input data from a sensor, analyze the input data using a neural network embodied by the single trained sensor data processing component, wherein the single trained sensor data processing component is trained to produce output data that approximates a plurality of task-specific transformations performed in a pipeline manner, and produce the output data following transformation of the input data.

In some embodiments, the apparatus comprising the single component sensor data processing component is further configured to output the output data to a second system. The plurality of task-specific transformations may include sequentially executed sensor-specific transformations. In some embodiments, the input data comprises raw data, while in other embodiments, the input data comprises data that has undergone at least one pre-processing transformation.

An example embodiment includes a method for processing sensor data. The example method includes configuring a neural network to perform a plurality of task-specific transformations. The example method also includes receiving input data from a sensor. The example method also includes analyzing the input data using a single trained sensor data processing component embodying the neural network, wherein the single trained sensor data processing component is trained to produce output data that approximates a plurality of task-specific transformations performed in a pipeline manner. The example method also includes producing, from the single trained sensor data processing component, the output data following transformation of the input data utilizing the single trained sensor data processing component.

In some embodiments, the method further includes outputting the output data to a second system. The plurality of task-specific transformations may comprise sequentially executed sensor-specific transformations. In some embodiments, the input data comprises raw data, while in other embodiments, the input data comprises data that has undergone at least one pre-processing transformation.

An example embodiment includes a method for training a neural network embodied by a single sensor data processing component. The example method includes receiving input data from an input dataset collected from at least one sensor. The example method also includes receiving processed data from a processed dataset created by a sensor data processing pipeline system comprising a plurality of task-specific transformation components. The example method also includes training the neural network embodied by the single sensor data processing component to approximate a transformation from the input data to the processed data utilizing the plurality of task-specific transformation components.

In some embodiments, the input dataset is a pre-collected input value dataset, while in other embodiments, the input dataset is a dataset collected in real-time. The processed data of some embodiments comprises data processed in real-time, while the processed dataset of other embodiments is a pre-collected dataset. In some embodiments, the input data comprises raw data, while in other embodiments, the input data comprises data that has undergone at least one pre-processing transformation. The method of an example embodiment further includes removing hardware associated with the sensor data processing pipeline system comprising the plurality of task-specific transformation components.

BRIEF DESCRIPTION OF THE DRAWINGS

Figure 1:
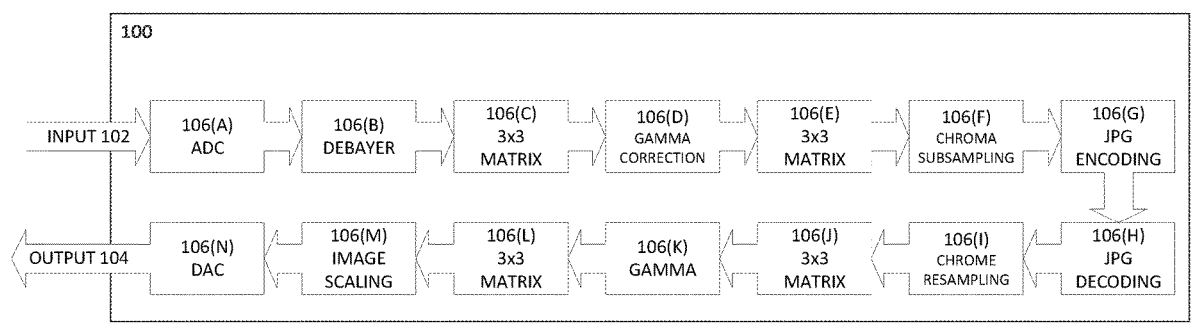
Figure 2:
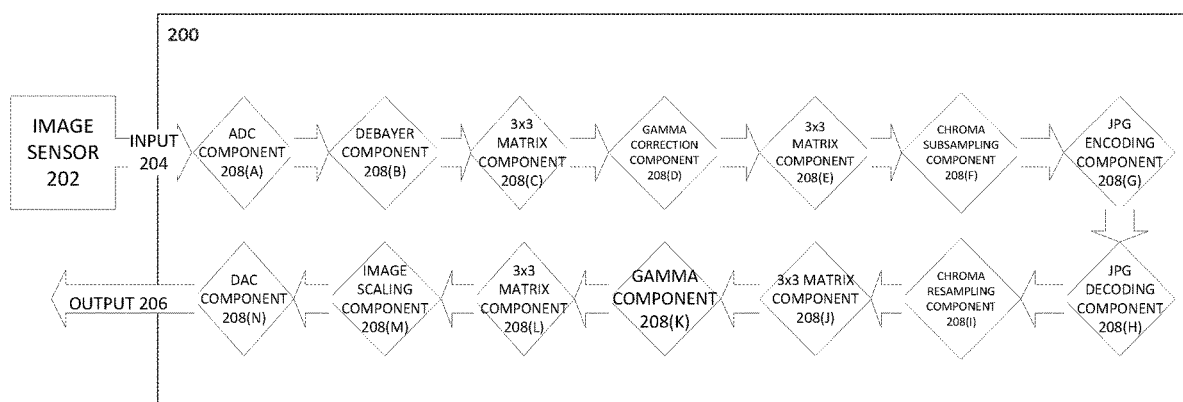
Figure 3:
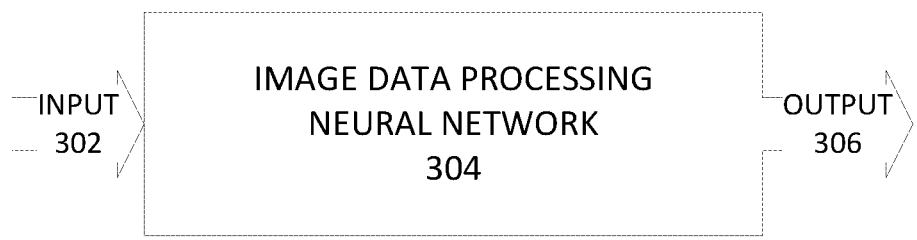
Figure 4:
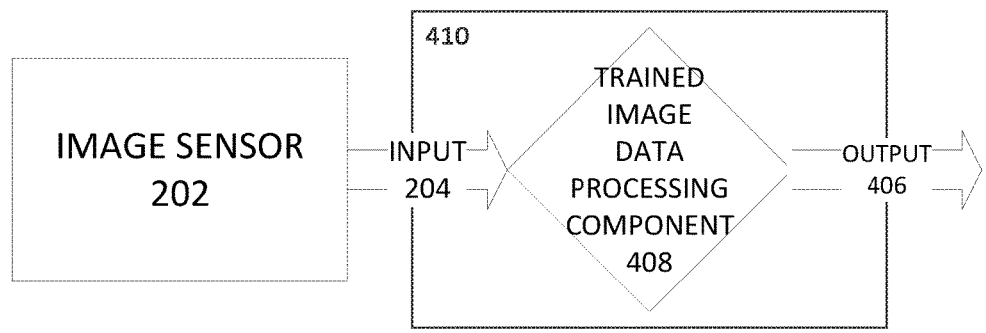
Figure 5:
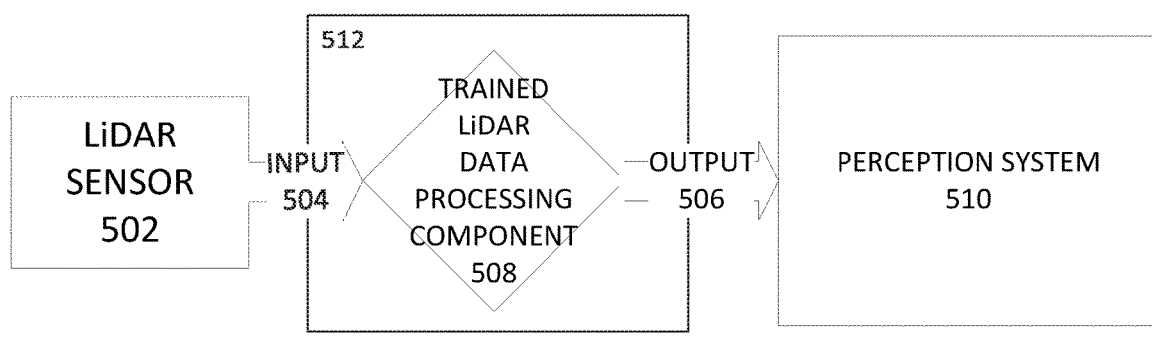
Figure 6:
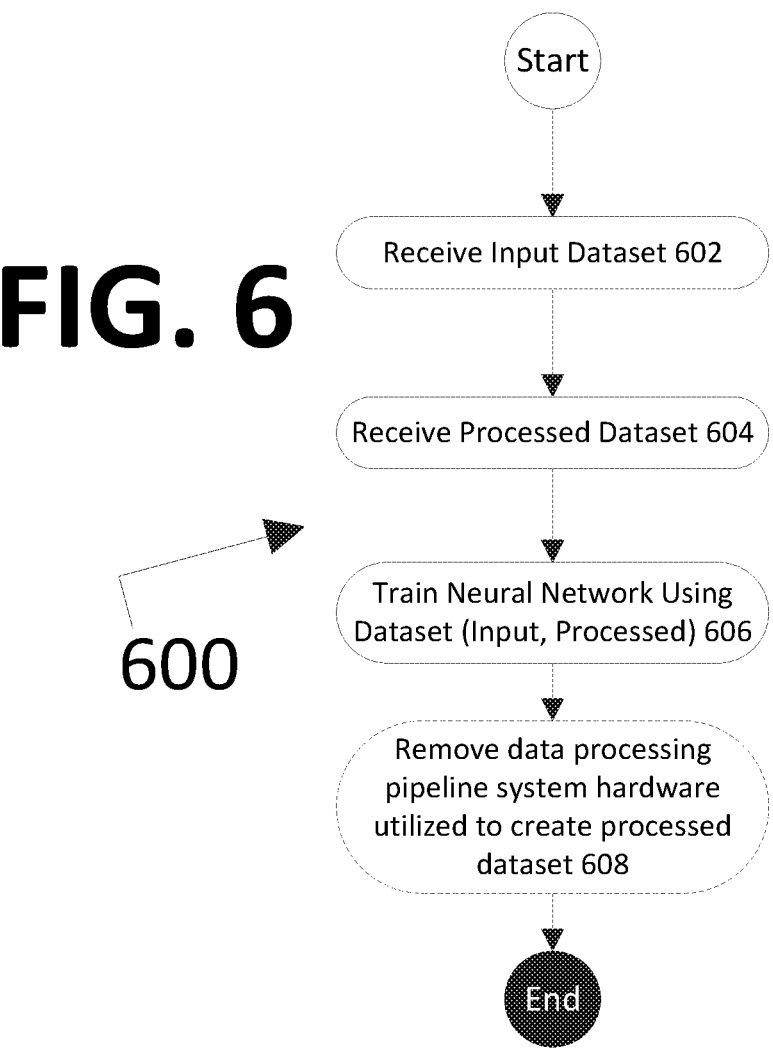

Having thus described embodiments of the invention in general terms, reference will now be made to the accompanying drawings, which are not necessarily drawn to scale, and wherein:

FIG. 1 is an example flow chart representation of a set of transformations for image data processing using an image data transformation pipeline approach;

FIG. 2 is an example system diagram of the image data transformation pipeline approach embodied by a system implementing an image data transformation pipeline;

FIG. 3 is an example flow chart representation of a set of transformations for image data processing in accordance with an embodiment of the present invention;

FIG. 4 is an example system diagram of a system for image data processing that may be implemented in accordance with an example embodiment of the present invention;

FIG. 5 is an example system diagram of a system for LiDAR data processing that may be implemented in accordance with an example embodiment of the present invention; and FIG. 6 is an example flowchart illustrating a method of training an example neural network in accordance with an example embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

FIG. 1 illustrates a flow diagram representing a process for image data processing utilizing a series of transformations through an image data processing pipeline 100. Image data processing pipeline 100 is illustrative of an example data processing pipeline. As shown, input 102 is processed into output 104 through a plurality of transformations 106 (A)-(N). In the illustrated pipeline, input 102 first undergoes an analog-to-digital conversion, or ADC transformation 106(A). The output of ADC transformation 106(A) then undergoes an image correction transformation, such as "debayer" transformation 106(B), where a Bayer filter is applied. The output of debayer transformation 106(B) then continues through the pipeline transformations 106(C)-(N) until the pipeline process is fully complete. After the final transformation, for example a digital-to-analog conversion, or DAC transformation 106(N) as illustrated, output 104 is produced, at which point the pipeline has achieved its overall transformation goal.

As illustrated, each of the transformations 106(A)-106(N) is an independent, task-specific transformation step that must be performed in a particular order. In alternative image data processing pipelines, additional and/or different transformations may be required. Thus, in some alternative image data processing pipelines, the number of transformations may increase linearly with the number of additional transformations required. Each sensor data processing pipeline may accomplish a particular transformation goal, such as to output data in a form interpretable by another system. A particular sensor data processing pipeline may accomplish a particular transformation goal, for example receiving input from a particular sensor and outputting the same content in a form interpretable by a particular system. For example, the input 102 illustrated in FIG. 1 may be from a camera sensor, and the image data processing pipeline 100 may have a transformation goal of transforming the input 102 into output 104 such that output 104 is interpretable by a display system (not shown). A plurality of sensor data processing pipelines may exist that utilize different transformations to achieve a particular transformation goal.

Accordingly, FIG. 1 is merely one example of a sensor data processing pipeline. Other sensor data processing pipelines may include alternative transformations, and/or additional transformations than the specific transformations 106 (A)-106(N) depicted in FIG. 1. Additionally, a particular sensor may have more than one data processing pipelines associated with its output to achieve a particular transformation goal, such that the task-specific transformations performed in the pipeline are different from, or in a different order than, the transformations 106(A)-106(N) as illustrated in FIG. 1. A particular sensor, for example, may have a plurality of sensor-specific transformations associated with it, such that the sensor-specific transformations must be sequentially executed to achieve a given transformation goal. While the illustrated image data processing pipeline may apply to a particular transformation goal for a particular sensor, for example the illustrated system may have a transformation goal of transforming image data from an image sensor, such as a camera, into a form interpretable by a second system, such as a display system, a different sensor data processing pipeline may apply for a different sensor and/or transformation goal. For example, a LiDAR data processing pipeline may include various task-specific transformations in a pipeline manner with a transformation goal to transform raw LiDAR data captured via a LiDAR sensor into a form interpretable by a second system, such as a perception system. An alternative LiDAR data processing pipeline may include various task-specific transformations in a pipeline manner with a transformation goal to transform input data captured by a LiDAR sensor and amplified via a pre-processing system into a form interpretable by a second system, such as a perception system.

FIG. 2 illustrates an example system architecture to implement the image data processing pipeline 100 using an image data processing pipeline system 200. The system includes an image sensor 202 and an image data processing pipeline system 200. Image sensor 202 may be a camera or similar image detection system. Image sensor 202 may capture data represented as input 204. Image sensor 202 may then transmit input 204 to image data processing pipeline system 200.

In alternative systems, image sensor 202 may output data to a pre-processing system (not shown). In such a system, input data 204 may be pre-processed by having undergone at least one pre-processing transformation. The pre-processing system may then transmit input 204 to image data processing pipeline system 200.

Image data processing pipeline system 200 may be a system on a chip including a plurality of specialized components. Alternative image data processing pipeline systems may utilize similar implementations.

From image sensor 202, image data processing pipeline system 200 receives input 204 for processing. As illustrated, input 204 then flows through a plurality of specialized components 208(A)-208(N). The plurality of specialized components 208(A)-208(N) are designed to implement the image data processing pipeline 100. Each specialized component in the plurality of specialized components 208(A)-208(N) is specially configured to perform a particular transformation. For example, ADC component 208(A) is specially configured to perform ADC transformation 106(A). The output from specialized ADC component 208(A) is then input into the next specialized component in the pipeline, for example specialized debayer component 208(B) as illustrated. Debayer component 208(B) is specially configured to perform the debayering transformation 106(B).

Each intermediate specialized component 208(C)-208(M) receives input from a preceding specialized component and provides an output to a subsequent specialized component. The final specialized components 208(N) produces the output 206. Output 206 may be fully processed in accordance with a transformation goal. For example, in the illustrated system, output 206 may be interpretable by a second system, such as a display system. In alternative systems, output 206 may be transmitted as input to a second system (not shown).

Notably, the number of task-specific transformations performed in a sensor data processing pipeline equals the number of specialized components required by a system implementing the sensor data processing pipeline. For example, the number of specialized components illustrated in FIG. 2 matches the number of transformations performed in FIG. 1. Accordingly, as the number of required specialized transformations in a given sensor data processing pipeline increases to accomplish a particular transformation goal, the number of components in the corresponding sensor data processing pipeline system implementing the sensor data processing pipeline also increases. For example, if a sensor data processing pipeline required 30 specialized transformations to accomplish a given transformation goal, a corresponding sensor data processing pipeline system may include 30 specialized components, such that each specialized transformation is performed by one specialized component. Additionally, in some system implementations, hardware components may be duplicated in instances when a transformation is required more than once. Alternatively, in some system implementations, additional hardware and/or circuitry may be required to enable a single component to be re-used for multiple transformations (not shown). Regardless, in a processing pipeline system, the required silicon footprint of the system grows as the number of transformations increases.

Accordingly, other sensor data processing pipeline systems may include alternative specialized components and/or additional specialized components rather than the specific specialized components 208(A)-208(N) depicted in FIG. 2. In some systems, input 204 may be transmitted directly from an alternative system rather than image sensor 202. For example input 204 may be transmitted from a Light Detection and Ranging (LiDAR) system, Inertial Navigation System (INS), radar, or other sensor into a sensor data processing pipeline system corresponding to a desired transformation goal. Alternatively, in some embodiments, input 204 may be transmitted from a sensor to a preprocessing system before reaching a sensor data processing pipeline system, such as the image data processing pipeline system 200. Additionally, a particular sensor may have more than one data processing pipelines associated with it to achieve a particular transformation goal, such that the task-specific transformation components in the pipeline system are different from, or in a different order than, the task-specific transformation components 208(A)-208(N) as illustrated in FIG. 2. While the illustrated image data processing pipeline system may apply to a particular transformation goal for a particular sensor, such as image sensor 202 as illustrated, a different sensor data processing pipeline system may be configured using different task-specific transformation components for a different sensor and/or transformation goal. For example, a LiDAR data processing pipeline system may include various other task-specific transformation components in a pipeline manner to accomplish a transformation goal to transform raw LiDAR data captured via a LiDAR sensor into a form interpretable by a second system, such as a perception system. An alternative LiDAR data processing pipeline system may include various task-specific transformation components ordered in a pipeline manner to accomplish a transformation goal to transform input data captured by a LiDAR sensor and amplified via a pre-processing system into a form interpretable by a second system, such as a perception system.

FIG. 3 illustrates a flow diagram representation of a method for processing image data consistent with an example embodiment of the present invention. As illustrated, input 302 is processed into output 306 using a specially trained neural network, e.g., specially trained image data processing neural network 304. Trained image data processing neural network 304 is specially trained to approximate a series of task-specific transformations. For example, as illustrated, trained image data processing neural network 304 is specially trained to approximate the task-specific transformations 106(A)-106(N) performed by image data processing pipeline 100. However, unlike the image data processing pipeline 100, input 302 is transformed into output 306, which approximates output 104, utilizing only a single component.

In an example embodiment, sensor data processing is performed using a sensor data processing neural network, such as trained image data processing neural network 304, that learns to approximate both a high-level processing task and a low-level processing task. Additionally, some embodiments perform sensor data processing using a sensor data processing neural network, such as trained image data processing neural network 304, that learns to approximate at least one high-level processing task and at least one low-level processing task simultaneously.

In an additional example embodiment, trained image data processing neural network 304 may learn to approximate a data processing pipeline that includes additional transformations that are not illustrated in image data processing pipeline 100. For example, image data processing neural network 304 may learn to approximate the image data processing pipeline 100 with one or more additional transformations for highlighting regions or subjects of interests in the captured image. Specifically, the additional transformations may be utilized to transform input data into output data that represents an image that highlights one or more objects or regions of interest in the input data, for example one or more persons or people in the captured image.

In an example embodiment, trained image data processing neural network 304 may approximate a transformation comprising a series of sequentially-executed specific transformations.

In an example embodiment, the input 302 may be raw data, meaning data collected from a sensor and received as input 302 without any intermediate processing. In another embodiment, the input 302 may be partially-processed data, meaning data that has been processed by at least one transformation.

In an example embodiment, the output 306 may be semi-processed data, meaning the output data is not yet in a form interpretable by an end system, and requiring further processing. In another embodiment, the output 306 may be in a format interpretable by an end system.

The trained image data processing neural network 304 is merely an example embodiment of a neural network that approximates the example image data processing pipeline 100. Some embodiment neural networks may approximate other data processing pipelines. Some embodiment neural networks may approximate data processing pipelines that perform transformations not illustrated in FIG. 1. Additionally, some embodiment neural networks may approximate data processing pipelines that include some, or all, of the transformations illustrated in FIG. 1

Accordingly, the specific trained image data processing neural network 304 illustrated in FIG. 3 trained to approximate image data processing pipeline 100 should not be taken to limit the spirit and scope of embodiments of the present invention.

FIG. 4 illustrates an example single component sensor data processing system for processing image data, in which an embodiment of the present invention may operate. As illustrated, a single specialized hardware component, such as a trained image data processing component 408, is configured to implement the trained image data processing neural network 304 depicted in FIG. 3. Image sensor 202 again captures input 204. Image sensor 202 transmits input 204 to trained image data processing component 408 for processing. Trained image data processing component 408 transforms input 204 into output 406.

The trained image data processing component 408 is configured to approximate the image data processing pipeline system 200. Accordingly, the output 406 from trained image data processing component 408 accurately approximates output 206. In other words, trained image data processing component 408 may effectively replace image data processing pipeline system 200. As illustrated, the trained image data processing component may be a single component in system 410. For example, system 410 may be a system-on-chip including the trained image data processing component 408. In some embodiments of an apparatus, the system 410 includes only the trained image data processing component 408, thus replacing all other processing and memory modules associated with a standard image data processing pipeline system.

As illustrated in the example system, the trained image data processing neural network 304 embodied by the single trained image data processing component 408 approximates the multi-component image data processing pipeline system 200. Accordingly, and as is illustrated in FIG. 4, the single specialized hardware component, e.g., trained image data processing component 408, accurately approximates the transformation accomplished using the plurality of specialized components 208(A)-(N) illustrated in FIG. 2. Thus, trained image data processing component 408 may replace image data processing pipeline system 200. Accordingly, the image data processing system illustrated in FIG. 4 requires substantially less hardware, thus lowering the system silicon footprint, lowering material costs, increasing available hardware space for other systems, decreasing required power consumption, and increasing overall system efficiency and efficacy by transforming from the input to the output using single, specialized hardware rather than performing multiple transformations in a pipeline approach.

In an example embodiment, trained image data processing component 408 may embody a neural network trained to approximate a sensor data processing pipeline, such as image data processing pipeline 100, with additional steps. For example, trained image data processing component 408 may embody a neural network trained to process image data through the transformations illustrated in FIG. 1 with additional transformations that accomplish the task of highlighting a person, or people, in the processed image.

Some embodiments of a system are configured to output to another system, for example a display or rendering system. In contrast, some embodiments of a system are configured to output to another processing system for further processing.

It will be appreciated that trained image data processing component 408 may be embodied in a number of different ways, such as various hardware implementations that embody the trained signal processing neural network. For example, trained image data processing component 408 may be embodied by a system-on-chip including a single, custom integrated circuit for implementing the trained neural network, specifically for embodying the trained image data processing neural network 304. Alternatively or additionally, the component may be embodied by other integrated circuitry configurations that replace an existing set of processing and memory hardware designed to perform in a pipeline manner. In an example embodiment, to embody the trained neural network, the single, custom integrated circuit comprises a set of arithmetic units, logical units, and/or buffer units, e.g. units configured to store intermediate results.

The single-component system illustrated in FIG. 4 provides significant advantages over the multi-component image data processing pipeline system 200. For example, because the neural network embodied by the single trained image data processing component 408 performs a set of in-place operations, throughput is improved. Additionally, reducing the number of components required from, as illustrated, fourteen to one, correspondingly reduces power consumption, silicon footprint, and material costs each by a factor of fourteen. Similarly, by reducing the number of components required from fourteen to one, greater hardware space is available, such as for other system components.

FIG. 5 illustrates an example system architecture for processing LiDAR data, that may be implemented by an embodiment of the present invention. As illustrated, a single specialized hardware component, trained LiDAR data processing component 508, is configured to function as a LiDAR data processing neural network. Like trained image data processing neural network 304, a LiDAR data processing neural network may approximate a series of task-specific transformations performed sequentially in a pipeline manner to accomplish a given transformation goal. Similarly, trained LiDAR data processing component 508 may approximate a sensor data processing pipeline system that implements a LiDAR data processing pipeline utilizing a series of task-specific transformation components arranged in a linear pipeline, similar to the image data processing pipeline system 200 but with different specially configured hardware components. Input data 504 is captured by LiDAR sensor 502 and transmitted to trained LiDAR data processing component 508. Trained LiDAR data processing component 508 approximates the series of LiDAR data transformations performed by the LiDAR data processing pipeline system as output 506.

In an example embodiment, the transformation goal approximated by a trained LiDAR data processing component may be to transform LiDAR sensor data into a form interpretable by a second system. In the embodiment illustrated in FIG. 5, for example, trained LiDAR data processing component 508 may embody a LiDAR data processing neural network that transforms input data, such as input 504, from a LiDAR sensor, such as LiDAR sensor 502, into output data, such as output data 506, that is interpretable by a perception system, for example perception system 510. The perception system may be configured to utilize input data to perform one or more tasks, for example field environment analysis. Accordingly, in the illustrated system, trained LiDAR data processing component 508 may provide output 506 in a form interpretable by perception system 510 for use in further analysis.

In an additional embodiment, trained LiDAR data processing component 508 may be configured to provide output to another system, for example a display or other rendering system, an analysis system, or a decision-making system. In another embodiment, the trained LiDAR data processing component 508 may be configured to output to another processing system for further processing.

As illustrated, the trained LiDAR data processing component 508 may be a single component in system 512. For example, system 512 may be a system-on-chip with a single component in the system 512, specifically including the trained LiDAR data processing component 508. In some embodiments of an apparatus, the system 512 includes only the trained LiDAR data processing component 508, thus replacing all other processing and memory modules associated with a standard LiDAR data processing pipeline system.

Trained LiDAR data processing component 508, as illustrated in FIG. 5, provides significant advantages over a multi-component system utilizing a plurality of task-specific transformation components. For example, because the neural network embodied by the single trained LiDAR data processing component 508 performs a set of in-place operations, throughput is improved. Additionally, trained LiDAR data processing component 508 reduces the number of components required to one, which reduces power consumption, material cost, and silicon footprint. Similarly, by reducing the number of components required to one, trained LiDAR data processing component 508 may be smaller than a LiDAR data processing pipeline, which saves space.

Additionally, systems may utilize a plurality of trained data processing components, such as of the type depicted in FIGS. 3 and 4, with the different components arranged, for example, in parallel or in series. For example, a multi-sensor system may have an image sensor and a LiDAR sensor. The example system may utilize a trained image data processing component, for example trained image data processing component 408, to transform data from the image sensor into a form interpretable by a display system. Additionally, the example system may utilize a single trained data processing component, for example trained LiDAR data processing component 508, to transform LiDAR data from a LiDAR sensor into a form interpretable by a perception system. The advantages of utilizing systems of example embodiments compounds as additional sensors are utilized within a system.

FIGS. 4 and 5 are merely example systems of single component sensor data processing systems utilizing a single trained sensor data processing component trained to embody a neural network. Other trained sensor data processing components may embody other neural networks trained to approximate other sensor data processing pipelines. In some embodiments, trained sensor data processing components are trained to embody neural networks approximating sensor data processing pipelines that may include alternative transformations and/or additional transformations than the specific transformations 106(A)-106(N) depicted in FIG. 1 or described above. Thus, such single component sensor data processing systems may replace corresponding sensor data processing pipeline systems while achieving the same transformation goal. Additionally, a particular sensor may have more than one trained sensor data processing components associated with it to achieve a particular transformation goal, such that each of the trained sensor data processing components associated with the particular sensor approximates a different sensor data processing pipeline including a plurality of task-specific transformations performed in a pipeline manner. If a particular sensor has a plurality of sensor-specific transformations associated with the sensor, such that the sensor-specific transformations must be sequentially executed to achieve a given transformation goal, a corresponding single component data processing system utilizes a single trained sensor data processing component embodying a neural network trained to approximate the sequentially executed sensor-specific transformations. Accordingly, embodiments of the present invention can be implemented for any sensor with a corresponding sensor data processing pipeline system implementing a plurality of task-specific transformations to meet a particular transformation goal.

Accordingly, the single component sensor data processing systems illustrated in FIGS. 4 and 5 should not be taken to limit the spirit and scope of embodiments of the present invention.

FIG. 6 illustrates a flowchart depicting a method for training a specialized neural network in accordance with an embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described may be embodied by computer program instructions. In this regard, the computer program instructions that embody the procedures described above may be stored by a memory of an apparatus employing an embodiment of the present invention and executed by a processor in the apparatus.

As will be appreciated, any such computer programs instructions may be loaded onto a computer or other programmable apparatus (e.g. hardware, chip) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory product an article of manufacture, the execution of which implements the function specified in the flowchart block(s).

The computer program instructions may also be loaded onto a computer or other programmable apparatus to cause a series of operations to be performed on the computer or other programmable apparatus to produce a computer implemented process such that the instructions which execute on the computer or other programmable apparatus provide operations for implementing the functions specified in the flowchart block(s). As such, the operations of FIG. 6, when executed, convert a computer or processing circuitry into a particular machine configured to perform an example embodiment of the present invention. Accordingly, the operations of FIG. 6 define an algorithm for configuring a computer or processor to perform an example embodiment. In some cases, a general purpose computer may be provided with an instance of the processor which performs the algorithms of FIG. 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, a method, apparatus and computer program product may be configured for training a data processing neural network, and more specifically, for training a neural network to transform input data into output data by approximating a plurality of individual transformations. In an embodiment, input data is raw data captured directly by a sensor. In an embodiment, output is in a form interpretable by a second system.

FIG. 6 is an example flowchart illustrating a method for training a specialized data processing neural network in accordance with an embodiment of the present invention. It should be appreciated that the operations of FIG. 6 may be performed on a specialized hardware component, though in some embodiments, are not limited to a single specialized hardware component. For example, non-integrated circuit systems may similarly be trained.

Additionally, it should be appreciated that the specialized data processing neural network may be implemented using a variety of neural network frameworks. For example, in a particular embodiment, the specialized data processing neural network may implement a deep neural network framework. In some embodiments, alternative neural network frameworks are implemented to produce similar results.

In an example embodiment of the present invention, a user may utilize a system, including a computing device, to train the neural network in accordance with the method illustrated in FIG. 6. For example, as shown in block 602, an input dataset may be received. Each element in the input dataset may be a collected data sensor value, for example, a data value representing data collected by a sensor, such as an image sensor, a LiDAR sensor, or the like, as a vehicle carrying the sensor advances, e.g., drives, along a particular route. As shown in block 604, a processed dataset may then be received. The processed dataset may be the output provided by a multi-component sensor data processing pipeline, such as output 206 processed by image data processing pipeline system 200 as shown in FIG. 2, following processing the input provided by the sensor. Each element in the processed dataset may be, for example, a data representation paired to a given value in the input dataset. Accordingly, an input dataset value may correspond with a processed dataset value such that the corresponding processed dataset value is the output of a given data processing pipeline system, for example image data processing pipeline system 200, with the input dataset value as input. As described below, the input and processed dataset may be received directly from a sensor and a data processing pipeline system, respectively, or the input and/or processed datasets may be stored in memory that is a component of, or accessible by, the computer system. As shown in block 606, the neural network may then be trained using a combined dataset comprising the input dataset and processed dataset. Each input dataset value and corresponding processed dataset value may form a tuple (Input, Processed). The tuples may be used to train the neural network to approximate an overall transformation performed by the plurality of task-specific transformation components in the sensor data processing pipeline system used to create the processed dataset. It will be understood that the training in block 606 may be performed using various neural network training techniques and algorithms, including any regression style network, such as an inception network architecture. In some embodiments, a loss function is associated with training the data processing neural network. In some embodiments, the loss function associated with training the data processing neural network is log loss or cross-entropy loss.

In some embodiments, a neural network is trained using a training computing device, or multiple computing devices, prior to being deployed. In some embodiments of a system, the computing device performing the training includes a processor and memory including computer coded instructions, such that memory and processor are coupled to execute the above operations under the control of corresponding software. For example, a specially programmed computer may be configured to train a neural network for signal data processing as described herein, and, subsequently, the trained neural network is deployed on a system on a chip utilizing a single, specialized data processing component for implementing the neural network, as described herein.

At optional block 608, hardware forming a data processing pipeline system, such as the multi-component sensor data processing pipeline, used to create the processed dataset is removed. In some embodiments, a training system includes hardware forming a data processing pipeline system. In some embodiments, this system is used to convert a processed data value for at least one previously collected input value. In some embodiments, the data processing pipeline system hardware allows for real-time collection of an input dataset and/or processed dataset. For example, in some embodiments, an autonomous vehicle with one or more sensors captures input data on a particular route and stores it in an input dataset. In some embodiments, an autonomous vehicle with one or more sensors includes onboard data processing pipeline system hardware for use in generating a processed dataset as input values are captured, such that the processed dataset may be generated in real-time.

One of ordinary skill in the art would readily appreciate that the above method is generic and can be trained from a plurality of input datasets, including random collections of different input source types. Such an implementation trained generically has the added advantage of enabling coverage of previously unseen inputs, such as image capture data from unseen or unique regions.

In an example embodiment, the input dataset may comprise multiple component datasets. The input dataset may be constructed based on the multiple component datasets.

In another example embodiment, the input dataset or datasets may comprise labeled data, with the label characterizing the associated data. The labeled data may be labeled automatically, based on aggregated data. For example, in an image dataset collected by an autonomous vehicle, the dataset may contain image data for detected environmental observations. This dataset may be constructed over a series of drives throughout the same region or along the same route. The system may automatically detect differences between the contents of the same locations and automatically label data based on whether a detected observation has moved between the multiple data aggregation time periods.

In some embodiments, the input dataset received in block 602 is collected in real-time. For example, a LiDAR sensor may collect LiDAR data in real-time while on a particular route and store the data in an input dataset. In some embodiments, an input dataset collected in real-time may be combined with a second dataset, which may have been pre-collected or collected in real-time at a second time, to form a hybrid dataset.

In some embodiments, the processed dataset is also collected or generated in real-time. In some embodiments, the processed dataset is pre-collected or pre-generated. In some embodiments, the processed dataset is a hybrid dataset, including data values collected or generated in real-time, and data values pre-collected or pre-generated. The processed dataset type (e.g., real-time, pre-collected, pre-generated, hybrid, or the like) may be different than the type of input dataset (e.g., real-time, pre-collected, pre-generated, hybrid, or the like). A real-time processed dataset may contain values processed in real-time through a system formed by a plurality of task-specific transformation components, such as the image data processing pipeline system 200. For example, a vehicle with an associated LiDAR sensor may also have an associated LiDAR data processing pipeline system and a single-component trained LiDAR data processing component to undergo the training process illustrated by FIG. 6. The LiDAR sensor may collect an input value, and store the input value in an input dataset. The input value may then, for example, be input into the associated LiDAR data processing pipeline system and fully processed into an output value, which then may be stored in a processed dataset. A combined dataset of (Input, Processed) may then be created utilizing the input dataset and processed dataset. Tuples from the combined dataset, for example, are then input into the single-component embodying the neural network undergoing training. In some embodiments, once the sing-component embodying the neural network approximates the processed data values produced by the LiDAR data processing pipeline system with a desired accuracy, training is considered complete. In some embodiments, the LiDAR data processing pipeline system hardware is then removed. In some embodiments, the single-component embodying the neural network is then used to perform real-time LiDAR data processing.

In some embodiments, the combined dataset is created after all desired input data values were collected and all processed data values were computed. Alternatively, in some embodiments, input data values are continuously input into the LiDAR data processing pipeline system to produce a processed data value, and the new tuple of (Input, Processed) is used to train the single-component embodying the neural network undergoing training as new input is collected. In some embodiments, continuous training of this sort may be desired to further improve accuracy of single-component embodying the neural network.

In accordance with the above, a trained sensor data processing neural network may approximate a sensor data processing pipeline. Accordingly, the output of a trained sensor data processing neural network may approximate the same output of a sensor data processing pipeline, but may not necessarily perform all, or any, of the specific intermediate calculations or transformations performed in the sensor data processing pipelines. Similarly, a single component trained sensor data processing neural network system need not necessarily generate all, or any, of the specific intermediate values generated by a multi-component sensor data processing pipeline system. Accordingly, a trained sensor data processing neural network may entirely replace a sensor data processing pipeline, and a single component trained sensor data processing neural network system may replace all components of a corresponding sensor data processing pipeline system. Thus, embodiments of a system may reduce the associated system component silicon footprint, decrease required power consumption, decrease component costs, and improve efficiency and efficacy over sensor data processing pipeline systems.

As such, the trained sensor data processing component may reduce the component silicon footprint, decrease required power consumption, decrease component costs, and improve efficiency and efficacy of sensor data processing systems.

In some embodiments, certain operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A single component sensor data processing system configured to:
receive input data from a particular sensor of a plurality of sensors associated with a vehicle;
analyze the input data using a neural network embodied on a particular single integrated chip corresponding to the particular sensor from which the input data was received, wherein the neural network on the single integrated chip is trained to produce output data that approximates a plurality of task-specific transformations performed in a serial pipeline, the plurality of task-specific transformations corresponding to the particular sensor to transform the input data specific to the particular sensor into the output data that is interpretable by a particular second system that processes data from each of the plurality of sensors, wherein serial pipeline recieves training input data corresponding to the input data as input and generates processed data as output, and wherein the neural network is trained based on the training input data and the processed data; and
produce the output data following the transformations of the input data.

2. The single component sensor data processing system according to claim 1, wherein the single integrated chip is further configured to output the output data to the particular second system.

3. The single component sensor data processing system according to claim 1, wherein the plurality of task-specific transformations comprises a plurality of sequentially executed transformations corresponding to a sensor type of the particular sensor.

4. The single component sensor data processing system according to claim 1, wherein the input data comprises raw data.

5. The single component sensor data processing system according to claim 1, wherein the processed dataset is generated from the input dataset by processing each training input data of the input dataset using a separate hardware component for each task-specific transformation of the plurality of task-specific transformations performed in the serial pipeline.

6. The single component sensor data processing system according to claim 1, wherein the plurality of task-specific transformations performed in the serial pipeline comprises an image correction transformation, a noise reduction transformation, an image scaling transformation, a gamma correction transformation, an image enhancement transformation, a color-space conversion transformation, a chroma subsampling transformation, a framerate conversion transformation, and an image compression transformation.

7. The single component sensor processing system according to claim 1, wherein the sensor data is received directly from the particular sensor.

8. The single component sensor processing system according to claim 1, wherein the plurality of task-specific transformations comprises an additional transformation that highlights a region of interest within the input data.

9. The single component sensor processing system according to claim 1, wherein the particular second system comprises a perception system configured to perform a field environment analysis based at least in part on a plurality of output data produced via processing of a plurality of portions of input data from the plurality of sensors.

10. A method for processing data comprising:
configuring a neural network to perform a plurality of task-specific transformations;
receiving input data from a particular sensor of a plurality of sensors associated with a vehicle;
analyzing the input data using the neural network embodied on a particular single integrated chip corresponding to the particular sensor from which the input data was received, wherein the neural network on the single integrated chip is trained to produce output data that approximates the plurality of task-specific transformations performed in a serial pipeline, the plurality of task-specific transformations corresponding to the particular sensor to transform the input data specific to the particular sensor into the output data that is interpretable by a particular second system that processes data from each of the plurality of sensors, wherein serial pipeline recieves training input data corresponding to the input data as input and generates processed data as output, and wherein the neural network is trained based on the training input data and the processed data; and
producing, from the single integrated chip, the output data following the transformations of the input data utilizing the single integrated chip.

11. The method for processing data according to claim 10, further comprising outputting, via the single integrated chip, the output data to the particular second system.

12. The method for processing data according to claim 10, wherein the plurality of task-specific transformations comprises a plurality of sequentially executed transformations corresponding to a sensor type of the particular sensor.

13. A method for training a neural network embodied on a single integrated chip, the method comprising:
receiving training input data from an input dataset collected from at least one sensor of a plurality of sensors associated with a vehicle;
receiving processed data from a processed dataset created by a sensor data processing pipeline system comprising a plurality of task-specific transformation components for performing a plurality of task-specific transformations in a serial pipeline, wherein the serial pipeline recieves training input data as input and generates the processed data as output; and
training the neural network embodied on the single integrated chip to approximate the plurality of task-specific transformations from the training input data to the processed data, wherein the neural network is trained based on the training input data and the processed data, and wherein the single integrated chip corresponds to the at least one sensor, and wherein the plurality of task-specific transformations correspond to the at least one sensor to transform the training input data specific to the particular sensor into the processed data that are interpretable by a particular second system that processes data from each of the plurality of sensors.

14. The method for training a neural network according to claim 13, wherein the training input dataset is a pre-collected input value dataset.

15. The method for training a neural network according to claim 13, wherein the training input dataset is a dataset collected in real-time.

16. The method for training a neural network according to claim 13, wherein the processed dataset is a pre-collected dataset.

17. The method for training a neural network according to claim 13, wherein the training input data comprises raw data.

18. The method for training a neural network according to claim 13, wherein the training input data comprises data that has undergone at least one pre-processing transformation.

\* \* \* \* \*